United States Patent
Nakamura et al.

(10) Patent No.: US 8,719,880 B2
(45) Date of Patent: May 6, 2014

(54) CONTENT MANAGEMENT SERVER AND CONTENT MANAGEMENT METHOD

(75) Inventors: Koji Nakamura, Kanagawa (JP); Toshio Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/384,433

(22) PCT Filed: May 26, 2011

(86) PCT No.: PCT/JP2011/002940
§ 371 (c)(1),
(2), (4) Date: Jan. 17, 2012

(87) PCT Pub. No.: WO2011/155141
PCT Pub. Date: Dec. 15, 2011

(65) Prior Publication Data
US 2012/0117603 A1 May 10, 2012

(30) Foreign Application Priority Data
Jun. 8, 2010 (JP) .................................. 2010-131181

(51) Int. Cl.
H04N 7/173 (2011.01)
H04N 5/783 (2006.01)
H04N 5/93 (2006.01)

(52) U.S. Cl.
USPC ................. 725/90; 725/88; 725/98; 725/100; 725/131; 725/114; 725/93; 386/349; 386/278; 386/353

(58) Field of Classification Search
CPC ..................... H04N 21/2387; H04N 21/47205; H04N 21/4333; H04N 21/6587
USPC ......... 725/32, 88, 98, 100, 102, 131, 114, 93, 725/90; 386/349, 343, 278, 287, 351, 353
See application file for complete search history.

(56) References Cited

U.S. PATENT DOCUMENTS 5,539,527 A * 7/1996 Kajimoto et al. ............. 386/278
7,346,163 B2 * 3/2008 Pedlow et al. ................ 380/210

(Continued)

FOREIGN PATENT DOCUMENTS

CN 1790528 A 6/2006
JP 2006-139846 A 6/2006

(Continued)

OTHER PUBLICATIONS

International Search Report for PCT/JP2011/002940 dated Jul. 5, 2011.

*Primary Examiner* — Pinkal R Chokshi
(74) *Attorney, Agent, or Firm* — Pearne & Gordon LLP

(57) ABSTRACT

Disclosed is a content management server that enables a playback restart from a suitable playback interruption position to be made possible even when editing processing has been executed on content copied to a content playback apparatus. In a content management server (200) that manages content and also performs content editing by deleting a portion within the content or adding to a portion within the content, a transmission/reception section (202) receives a first playback interruption position that is a position at which content playback was interrupted by a content playback apparatus (100), a playback interruption position calculation section (209) calculates a second playback interruption position corresponding to a position at which content playback was interrupted by the content playback apparatus (100) in content after editing, based on an editing interval deleted by editing within the content and the first playback interruption position, and the transmission/reception section (202) transmits the second playback interruption position to the content playback apparatus (100).

5 Claims, 18 Drawing Sheets

(56) References Cited

U.S. PATENT DOCUMENTS

| | | | |
|---|---|---|---|
| 7,362,950 B2* | 4/2008 | Jun et al. | 386/343 |
| 8,255,957 B1* | 8/2012 | Mattox | 725/63 |
| 2002/0178453 A1* | 11/2002 | Jun et al. | 725/88 |
| 2003/0142955 A1* | 7/2003 | Hashizume et al. | 386/52 |
| 2006/0085814 A1* | 4/2006 | Okamoto et al. | 725/29 |
| 2006/0120692 A1 | 6/2006 | Fukuta | |
| 2006/0218617 A1* | 9/2006 | Bradstreet et al. | 725/135 |
| 2006/0227721 A1* | 10/2006 | Hirai et al. | 370/254 |
| 2006/0248560 A1* | 11/2006 | Wada et al. | 725/89 |
| 2007/0083571 A1* | 4/2007 | Meller et al. | 707/203 |
| 2008/0212939 A1* | 9/2008 | Furuichi | 386/95 |
| 2008/0282285 A1* | 11/2008 | Thomas et al. | 725/32 |
| 2008/0317431 A1* | 12/2008 | Mishima et al. | 386/52 |
| 2009/0299748 A1* | 12/2009 | Basson et al. | 704/270 |
| 2009/0310946 A1* | 12/2009 | Nishio | 386/124 |
| 2010/0129050 A1* | 5/2010 | Alexander et al. | 386/68 |
| 2011/0093885 A1* | 4/2011 | Ravula | 725/32 |
| 2012/0023407 A1* | 1/2012 | Taylor | 715/731 |

FOREIGN PATENT DOCUMENTS

| | | |
|---|---|---|
| JP | 2007-020089 A | 1/2007 |
| JP | 2008-085934 A | 4/2008 |
| JP | 2008-219138 A | 9/2008 |
| JP | 2008-283368 A | 11/2008 |

* cited by examiner

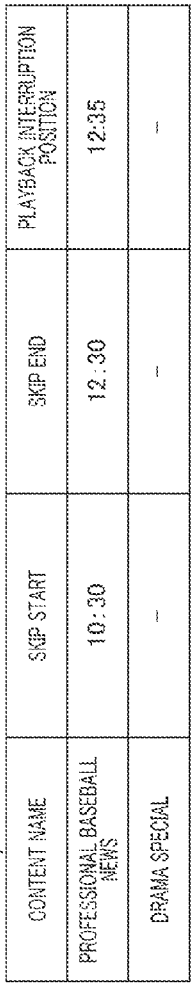
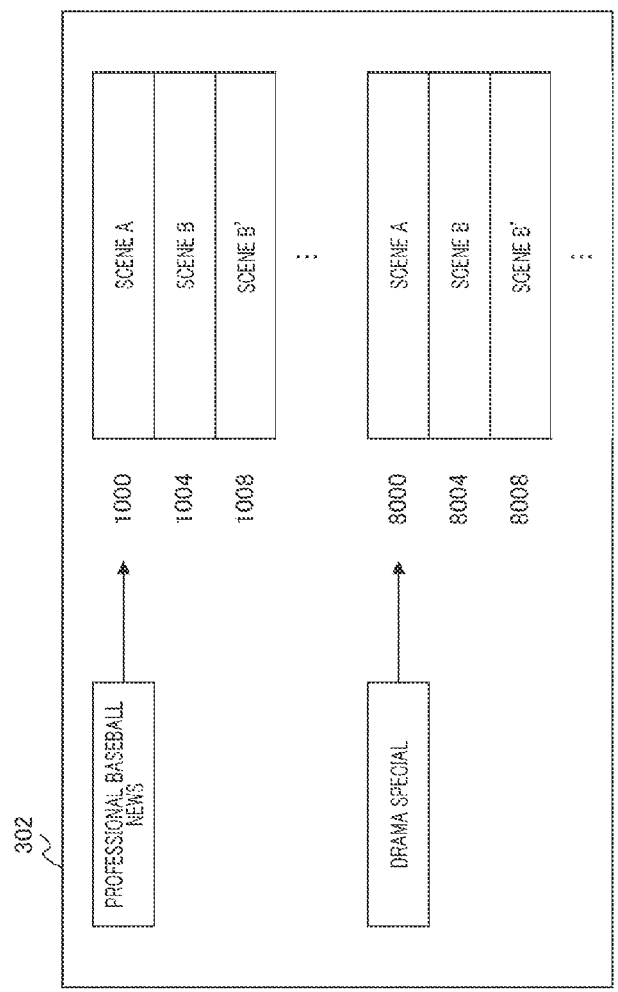

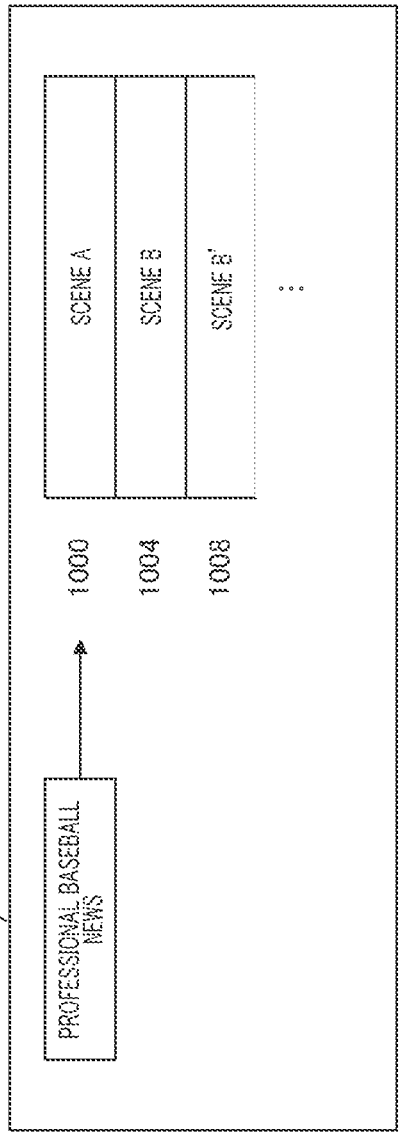

| 0 | t1 | t2 | | t3 | t4 | | | 60 MINUTES |
|---|---|---|---|---|---|---|---|---|
| SCENE A | B | CM (2 MINUTES) | B' | C | CM (3 MINUTES) | D | E | |

FIG.5

| DELETION START t3 | 12:30 |
|---|---|
| DELETION END t4 | 12:40 |

FIG.6

| CONTENT NAME | EDITING INFORMATION | PLAYBACK INTERRUPTION POSITION |
|---|---|---|
| PROFESSIONAL BASEBALL NEWS | DELETION 12:30~12:40 | 00:00 |

FIG.7

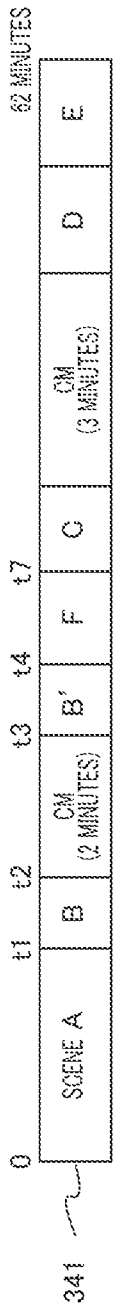

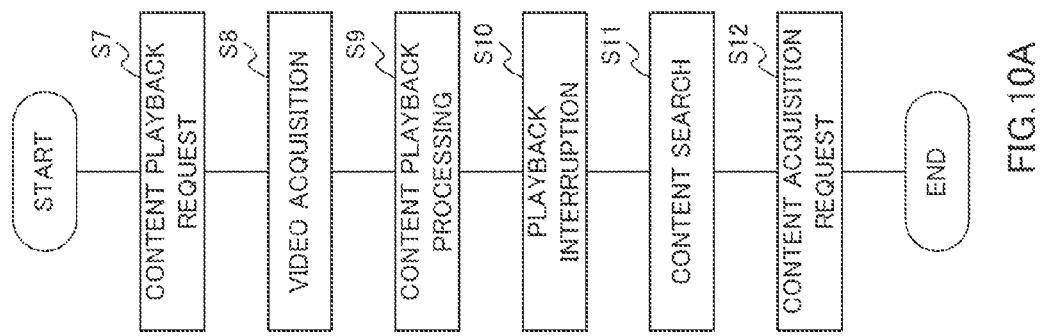

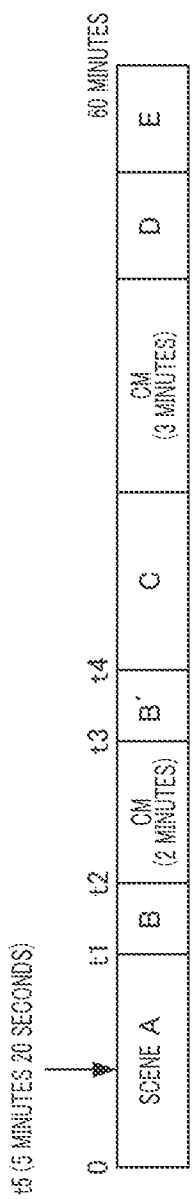

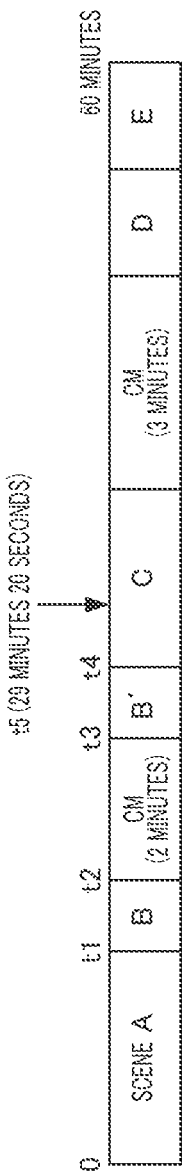

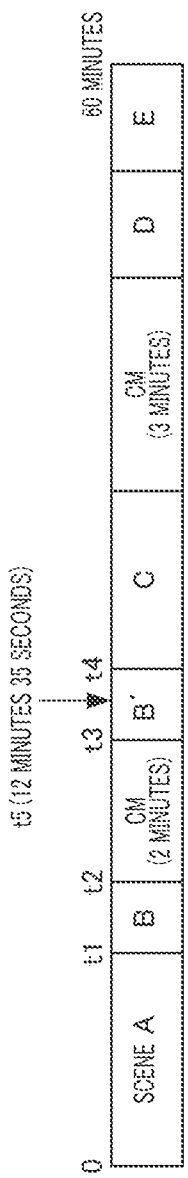

| CONTENT NAME | AUTOMATIC SKIP START | AUTOMATIC SKIP END |
|---|---|---|
| PROFESSIONAL BASEBALL NEWS | 10:30 | 12:30 |

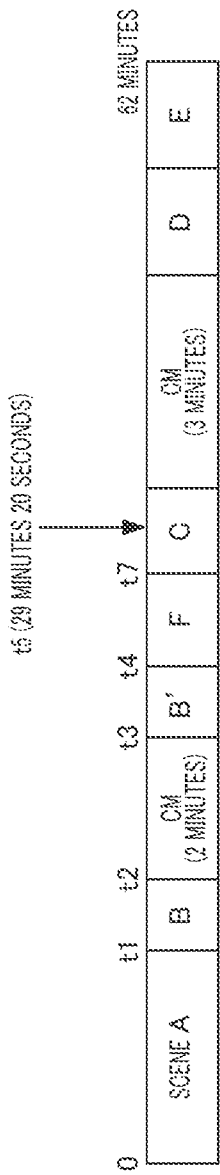

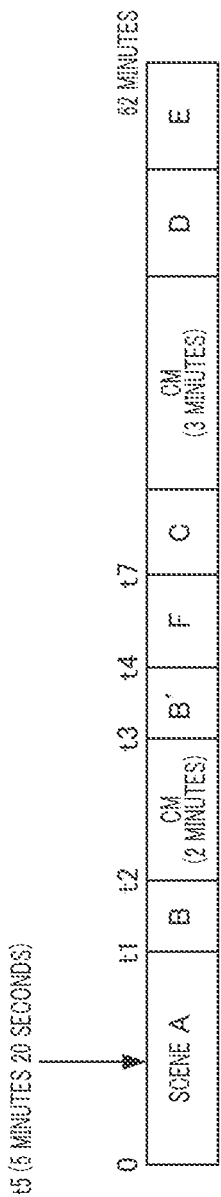

CONTENT MANAGEMENT SERVER AND CONTENT MANAGEMENT METHOD

TECHNICAL FIELD

The present invention relates to a content playback apparatus used for playback of content copied from a server, and a content management system having a content management server used for content storage or management. More particularly, the present invention relates to a content management server and content management system that enable a user to restart playback from a suitable playback interruption position when a user re-views content after changing content for which playback has been interrupted to a desired form.

BACKGROUND ART

In recent years, the use of wideband networks and HD (High Definition) content has become widespread, and a demand has arisen for playback apparatuses enabling content to be enjoyed inside or outside the home, through streaming playback of HD content, high-speed downloading from a server, and so forth. As a method for restarting playback from an interruption position when playback is interrupted during content playback by such a content playback apparatus, a method is known whereby a playback interruption position is stored, and playback is restarted from that interruption position. In Patent Literature 1, a technology is disclosed that enables a content playback apparatus to store all positions at which a user interrupts playback up to completion of viewing of one item of content, and restart from those playback interruption positions. Furthermore, in Patent Literature 1, a content playback apparatus performs preview implementation for viewed video. By this means, a content playback apparatus enables a user to recall easily what kind of contents were in a content portion viewed once. Also, it is possible for a user to easily select a playback interruption position for viewing. Such content editing processing is performed by a content management server.

CITATION LIST

Patent Literature

PTL 1
Japanese Patent Application Laid-Open No. 2008-219138

SUMMARY OF INVENTION

Technical Problem

A content management server manages content (post-editing content) resulting when a user performs editing processing on unedited content (pre-editing content) on the content management server. Also, when restarting content playback, the content playback apparatus re-copies that content from the content management server. At this time, depending on the timing of content editing by the content management server, content having different editing contents before and after restarting playback may be copied. For example, the content playback apparatus may copy pre-editing content before a content playback interruption, but re-copy post-editing content when content playback is restarted.

Here, it is assumed that pre-editing content managed by a content playback apparatus and post-editing content managed by a content management server differ in content contents or content length. In this case, a difference arises in content contents and content length between content managed by the content playback apparatus (pre-editing content) and content re-copied by the content playback apparatus when content playback is restarted (post-editing content). Consequently, a content playback apparatus cannot restart playback from a suitable playback interruption position simply by managing a playback interruption position of pre-editing content as in the above-described technology.

It is an object of the present invention to provide a content management server and content management method that enable playback to be restarted from a suitable playback interruption position even when editing processing has been performed on content copied to a content playback apparatus.

Solution to Problem

A content management server according to a first aspect of the present invention, in a system having a content playback apparatus that, when playback of interrupted content is restarted, acquires the content from the content management server, and the content management server that stores the content and performs editing of the content by deleting a portion within the content or adding to a portion within the content, employs a configuration comprising: a reception section that receives a first playback interruption position that is a position at which playback of the content was interrupted by the content playback apparatus; a calculation section that calculates a second playback interruption position corresponding to a position at which playback of the content was interrupted by the content playback apparatus in content after the editing, based on an editing interval deleted by the editing and the first playback interruption position within the content; and a transmission section that transmits the second playback interruption position to the content playback apparatus.

A content management method according to a second aspect of the present invention, in a system having a content playback apparatus that, when playback of interrupted content is restarted, acquires the content from a content management server, and the content management server that stores the content and performs editing of the content by deleting a portion within the content or adding to a portion within the content, employs a configuration comprising: a step of reporting a first playback interruption position that is a position at which playback of the content was interrupted by the content playback apparatus to the content management server from the content playback apparatus; a step of calculating a second playback interruption position corresponding to a position at which playback of the content was interrupted by the content playback apparatus in content after the editing, based on an editing interval deleted by the editing and the first playback interruption position within the content; and a step of reporting the second playback interruption position to the content playback apparatus from the content management server.

Advantageous Effects of Invention

The present invention enables a playback interruption position of post-editing content to be calculated from a playback interruption position of pre-editing content stored in a content playback apparatus even when editing processing has been performed on content copied to the content playback apparatus. Therefore, a user can restart playback from a playback interruption position without being aware of a change of content contents and content length due to editing.

BRIEF DESCRIPTION OF DRAWINGS

FIG. 2 is a drawing showing an example of terminal content information, and information relating to a content name and content entity, according to an embodiment of the present invention;

FIG. 3 is a drawing showing an example of server content information, and information relating to a content name and content entity, according to an embodiment of the present invention;

FIG. 5 is a drawing showing an example of a program configuration according to an embodiment of the present invention;

FIG. 6 is a drawing showing an example of a deletion start point and deletion end point according to an embodiment of the present invention;

FIG. 7 is a drawing showing an example of server content information generated at the time of content editing according to an embodiment of the present invention;

FIG. 9 is a drawing showing a program configuration and server content information after editing according to an embodiment of the present invention;

FIG. 10A is a flowchart showing content playback processing, content skipping processing, and content playback interruption processing by a content playback apparatus according to an embodiment of the present invention;

FIG. 11 is a drawing showing playback interruption position calculation processing according to an embodiment of the present invention (Case 1);

FIG. 12 is a drawing showing playback interruption position calculation processing according to an embodiment of the present invention (Case 2);

FIG. 13 is a drawing showing playback interruption position calculation processing according to an embodiment of the present invention (Case 3);

FIG. 16 is a drawing showing playback interruption position calculation processing according to an embodiment of the present invention (Case 4);

FIG. 17 is a drawing showing playback interruption position calculation processing according to an embodiment of the present invention (Case 5)

DESCRIPTION OF EMBODIMENT

Now, an embodiment of the present invention will be described in detail with reference to the accompanying drawings. The embodiment shown below is only one example, and the system configuration and function block configuration are not limited to those shown.

Figure 1A:
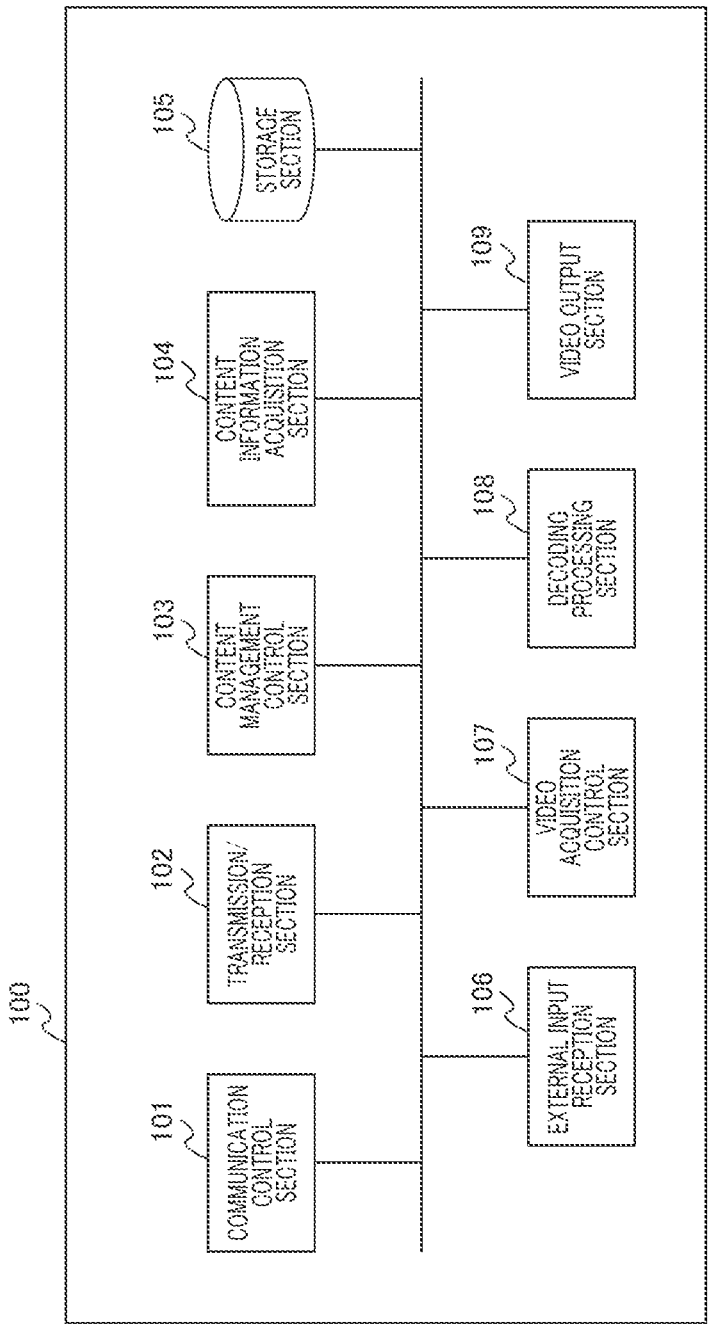
FIG. 1A is a block diagram showing a configuration of a content playback apparatus according to an embodiment of the present invention.

FIG. 1A is a block diagram showing the configuration of content playback apparatus 100 according to this embodiment. When restarting interrupted playback content, content playback apparatus 100 acquires that content from the content management server.

Content playback apparatus 100 shown in FIG. 1A has communication control section 101, transmission/reception section 102, content management control section 103, content information acquisition section 104, storage section 105, external input reception section 106, video acquisition control section 107, decoding processing section 108, and video output section 109.

In content playback apparatus 100, when playback of certain content is interrupted by content playback apparatus 100, communication control section 101 detects that there is a server (such as content management server 200) in the area around content playback apparatus 100. On detecting the presence of a server in the surrounding area, communication control section 101 outputs a playback-interrupted content information (terminal content information) acquisition request to content management control section 103.

There are no particular limitations on the method of detecting the presence of a server in the area around content playback apparatus 100. For example, a method is known whereby a device connected to a network performs such detection utilizing SSDP (Simple Service Discover Protocol) of UPnP (Universal Plug and Play). Thus, a possible method of detecting the presence of a server in the area around content playback apparatus 100 is to detect the presence of a content management server by utilizing that function.

When a content acquisition request is input from content management control section 103, transmission/reception section 102 outputs a content acquisition request to transmission/reception section 202 of content management server 200 described later herein.

When a terminal content information acquisition request is input from communication control section 101, content management control section 103 outputs a terminal content information acquisition request to content information acquisition section 104. When terminal content information has been acquired from content information acquisition section 104, content management control section 103 outputs a content acquisition request that includes terminal content information to transmission/reception section 102. Also, when a content playback request that includes content identification information is input from external input reception section 106, content management control section 103 outputs a video data acquisition request that includes content identification information to video acquisition control section 107.

Here, content identification information is information that uniquely defines content. For example, content identification information comprises a content name, an ID unique to each content, or the like. In the following description, a case will be described by way of example in which content identification information comprises a content name.

When playback information and a content entity are input from content management server 200 via transmission/reception section 102, content management control section 103 searches storage section 105 for content corresponding to the playback information. Then, if that content is present, content management control section 103 performs playback information recording and content entity overwrite processing on storage section 105.

When a terminal content information acquisition request is input from content management control section 103, content information acquisition section 104 performs a search for the desired content in storage section 105, and performs terminal content information acquisition processing. Then content information acquisition section 104 outputs the acquired terminal content information to content management control section 103.

Storage section 105 stores data such as terminal content information copied from content management server 200, information relating to a content name and content entity copied from content management server 200, and so forth.

FIG. 2A shows terminal content information 301 as an example. As shown in FIG. 2A, terminal content information 301 stores "Content name", "Skip start"/"Skip end", and a content playback apparatus 100 playback interruption position (time), in a mutually associated fashion. "Skip start"/"Skip end" indicate the start time and end time of a period (non-playback interval) in which content playback was not performed due to a skip operation or the like by the user during playback viewing on content playback apparatus 100.

For example, for the "Content name: Professional baseball news" content shown in FIG. 2A, it is shown that the skip start time is 10 minutes 30 seconds, the corresponding skip end time is 12 minutes 30 seconds, and the playback interruption position is 12 minutes 35 seconds. On the other hand, times are not entered for the "Content name: Drama special" content shown in FIG. 2A. This shows that skip start/skip end times and a playback interruption position have not been set for the "Content name: Drama special" content.

FIG. 2B shows content name and content entity related information 302 as an example. As shown in FIG. 2B, content name and content entity related information 302 stores "Content name" and "Content entity" in a mutually associated fashion. In content name and content entity related information 302 shown in FIG. 2B, a content entity can be referenced from a content name, and is stored for each scene. For example, FIG. 2B shows that the start of "Content entity: Scene A" of "Content name: Professional baseball news" can be accessed from address 1000.

External input reception section 106 detects a playback request signal that includes content identification information issued via a remote control or suchlike external control device, or a button provided on content playback apparatus 100. On detecting a playback request signal, external input reception section 106 outputs a content playback request that includes content identification information to content management control section 103.

A video data acquisition request that includes content identification information is input to video acquisition control section 107 from content management control section 103. Next, video acquisition control section 107 performs processing that acquires video data of the corresponding content (video data included in one scene or other), based on content identification information included in the input video data acquisition request. Video acquisition control section 107 outputs the acquired video data to decoding processing section 108.

When a video data acquisition request is input, video acquisition control section 107 searches storage section 105 to see if playback information for the corresponding content is present. Then, if a playback interruption position has been set in playback information for the corresponding content, video acquisition control section 107 performs processing that reads video data corresponding to the playback interruption position from storage section 105. Furthermore, if playback information for the corresponding content is found, video acquisition control section 107 performs determination processing to determine whether or not there are automatic skip start time/automatic skip end time settings in the corresponding content. Then, if automatic skip start time/automatic skip end time settings have been made in the corresponding content, video acquisition control section 107 performs the following processing. Specifically, on detecting that a time stamp for video data acquired from storage section 105 has reached an automatic skip start time of the playback information, video acquisition control section 107 first deletes currently acquired video data. Then video acquisition control section 107 acquires video data immediately after the automatic skip end time of the playback information.

Decoding processing section 108 performs decoding processing to decode video data input from video acquisition control section 107. Then decoding processing section 108 outputs the video data after decoding processing to video output section 109.

Video output section 109 performs processing that outputs video data input from decoding processing section 108 to a screen.

Figure 1B:
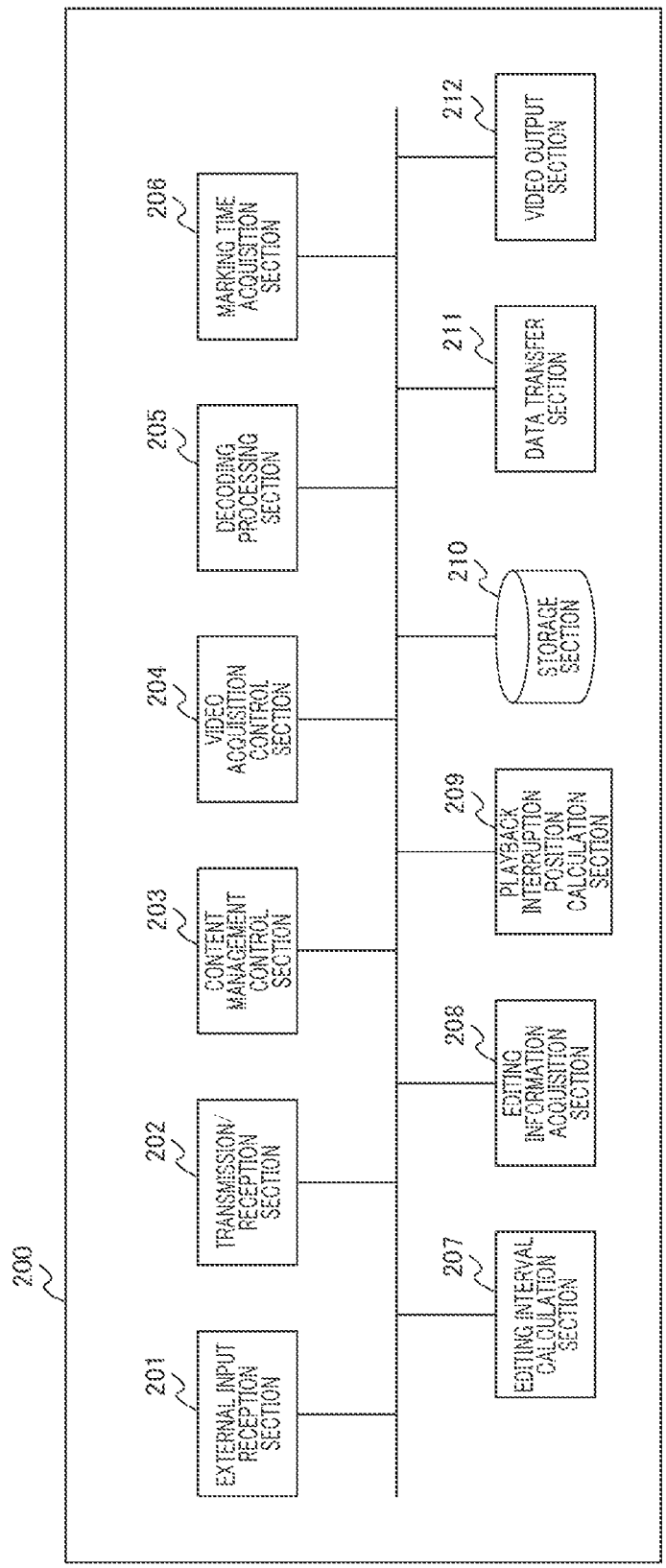
FIG. 1B is a block diagram showing a configuration of a content management server according to an embodiment of the present invention.

FIG. 1B is a block diagram showing the configuration of content management server 200 according to this embodiment. Content management server 200 manages content played back by content playback apparatus 100 or content management server 200. Content management server 200 also performs content editing by deleting a portion within content.

Content management server 200 shown in FIG. 1B has external input reception section 201, transmission/reception section 202, content management control section 203, video acquisition control section 204, decoding processing section 205, marking time acquisition section 206, editing interval calculation section 207, editing information acquisition section 208, playback interruption position calculation section 209, storage section 210, data transfer section 211, and video output section 212.

External input reception section 201 receives operation input from a user via a remote control or suchlike external control device. In the event of receiving operation input from a user, external input reception section 201 outputs a content playback request that includes content identification information to content management control section 203. External input reception section 201 also outputs a marking request when content editing is performed to marking time acquisition section 206.

Transmission/reception section 202 outputs a content acquisition request that includes terminal content information input from content playback apparatus 100 to content management control section 203. By this means, transmission/reception section 202 receives a playback interruption position indicating a position at which content playback was interrupted by content playback apparatus 100 included in terminal content information. Transmission/reception section 202 also outputs terminal content information to playback interruption position calculation section 209.

In addition, transmission/reception section 202 outputs information and a content entity input from data transfer section 211 to transmission/reception section 102 of content playback apparatus 100. Information input from data transfer section 211 is playback information (information used when content playback apparatus 100 restarts content playback) and a content entity. By this means, transmission/reception section 202 transmits to content playback apparatus 100 a playback interruption position corresponding to a position at which playback was interrupted by content playback apparatus 100 in post-editing content included in playback information.

When a content playback request is input from external input reception section 201, content management control section 203 outputs a video data acquisition request to video acquisition control section 204. Also, when a time stamp is input from marking time acquisition section 206, content management control section 203 outputs an editing interval calculation request that includes the time stamp. Furthermore, when a content acquisition request is input from content playback apparatus 100 via transmission/reception section 202, content management control section 203 outputs a content search request to editing information acquisition section 208. In addition, content management control section 203 outputs a playback interruption position calculation request that includes terminal content information included in a content acquisition request and editing information acquired from editing information acquisition section 208 to playback interruption position calculation section 209.

When a video data acquisition request is input from content management control section 203, video acquisition control section 204 searches the content stored in storage section 210, and acquires video data of the corresponding content. Video acquisition control section 204 outputs the acquired video data to decoding processing section 205. Also, when a time stamp acquisition request is input from marking time acquisition section 206, video acquisition control section 204 acquires a time stamp from video data acquired at the timing at which the time stamp acquisition request was input. Video acquisition control section 204 outputs the acquired time stamp to marking time acquisition section 206.

Decoding processing section 205 performs decoding processing to decode video data input from video acquisition control section 204. Then decoding processing section 205 outputs the video data after decoding processing to video output section 212.

When a marking request is input from external input reception section 201, marking time acquisition section 206 outputs a time stamp acquisition request to video acquisition control section 204. Marking time acquisition section 206 outputs a time stamp acquired from video acquisition control section 204 to content management control section 203.

Editing interval calculation section 207 performs editing interval calculation processing based on a time stamp (editing object playback time) included in an editing interval calculation request input from content management control section 203. Editing interval calculation section 207 records a calculated editing interval in storage section 210 as editing information, associated with a content name recorded in storage section 210.

When a content search request is input from content management control section 203, editing information acquisition section 208 performs processing that acquires editing information for the corresponding content from storage section 210. Editing information acquisition section 208 outputs the acquired editing information to content management control section 203.

A playback interruption position calculation request is input to playback interruption position calculation section 209 from content management control section 203. A playback interruption position calculation request includes editing information and terminal content information (a content playback apparatus 100 playback interruption position). Playback interruption position calculation section 209 calculates a playback interruption position in content edited on content management server 200 (post-editing content) based on the editing information and terminal content information. Here, a calculated playback interruption position corresponds to a position at which content playback apparatus 100 content playback was interrupted in post-editing content. Playback interruption position calculation section 209 records a calculated playback interruption position in storage section 210, associated with a content name recorded in storage section 210.

Storage section 210 stores server content information, content name and content entity related information, and so forth.

FIG. 3A shows server content information 311. Server content information 311 shown in FIG. 3A stores "Content name", "Editing information", and "Playback interruption position" in a mutually associated fashion. FIG. 3B shows content name and content entity related information 312 as an example. Content name and content entity related information 312 shown in FIG. 3B stores "Content name" and "Content entity" in a mutually associated fashion. For example, FIG. 3B shows that the start of "Content entity: Scene A" of "Content name: Professional baseball news" can be accessed from address 1000.

Data transfer section 211 acquires playback information and a content entity from storage section 210, and outputs the acquired information to transmission/reception section 202. Playback information includes, for example, a content name, playback interruption position, and control instruction information referenced when restarting playback on content playback apparatus 100. Control instruction information is an automatic skip start time/end time, for example, and will be described in detail later herein.

Video output section 212 performs processing that outputs video data input from decoding processing section 205 to a screen.

A detailed description will now be given of optimal content playback interruption position derivation processing by content playback apparatus 100 and content management server 200 of this embodiment.

FIG. 4, FIG. 10A, FIG. 10B, and FIG. 10C are flowcharts for explaining an optimal content playback interruption position derivation method implemented by content playback apparatus 100 and content management server 200 according to an embodiment of the present invention.

Figure 4:
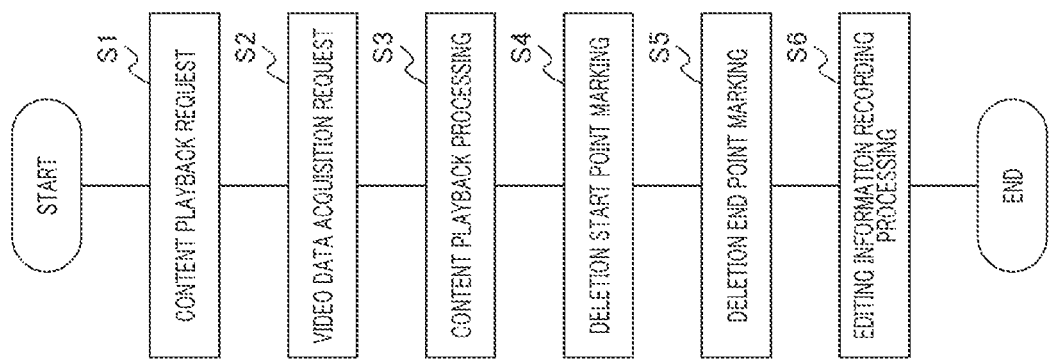
FIG. 4 is a flowchart showing content editing processing by a content management server according to an embodiment of the present invention.

Specifically, FIG. 4 is a flowchart showing the flow of content editing processing (step S1 through step S6) by content management server 200. Here, content management server 200 edits content identical to content copied to content playback apparatus 100.

Figure 10B:
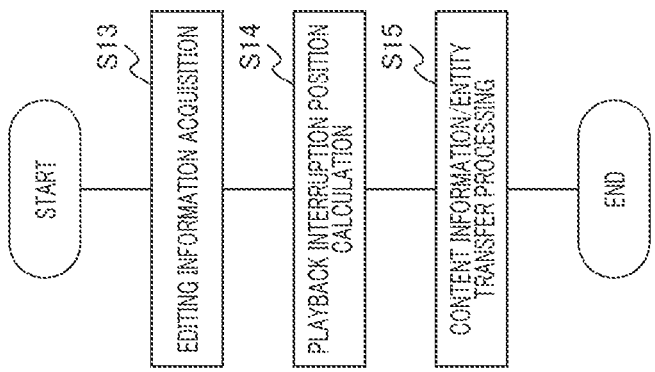
FIG. 10B is a flowchart showing post-editing content playback interruption position calculation processing by a content management server according to an embodiment of the present invention.
Figure 10C:
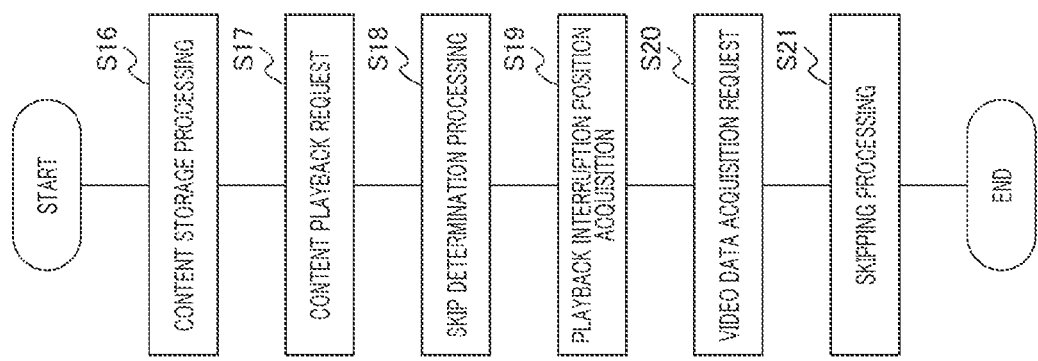
FIG. 10C is a flowchart showing playback restart processing from a playback interruption position by a content playback apparatus according to an embodiment of the present invention.

Also, specifically, FIG. 10A through FIG. 10C are flowcharts for explaining the following two processing methods (step S7 through step S21). The first processing is a method of extracting a difference between an original of content copied from content management server 200 to content playback apparatus 100 and the same content edited by content management server 200. The second processing is a method of calculating a playback interruption position. An original of content is pre-editing content, and the same content edited by content management server 200 is post-editing content.

FIG. 10A and FIG. 10C show processing by content playback apparatus 100, and FIG. 10B shows processing by content management server 200.

First, the flowchart in FIG. 4 will be explained. The flowchart in FIG. 4 shows content editing processing by content management server 200.

Here, a use case will be described in which, if video is duplicated before and after a commercial (CM), content management server 200 deletes the duplicated portion (video duplicated portion). For example, FIG. 5 shows the configuration of a 60-minute program, being an example of a program configuration comprising 5 minutes of CMs and 55 minutes of program contents (scene A, scene B, scene B', scene C, scene D, and scene E). For example, scene B corresponding to the interval from t1 to t2 immediately before a 2-minute CM period shown in FIG. 5, and scene B' corresponding to the interval from t3 to t4 immediately after the 2-minute CM period, are above-described video duplicated portions. Here, a use case is described in which content management server 200 selects and deletes either scene B or scene B' shown in FIG. 5.

External input reception section 201 detects a playback request signal that includes content information from a remote control or suchlike external control device. In the event of detecting a playback request signal, external input reception section 201 generates a playback request that includes control instruction information, and outputs the playback request that includes control instruction information to content management control section 203 (step S1).

When a playback request that includes control instruction information is input from external input reception section 201, content management control section 203 generates a video data acquisition request, and outputs the video data acquisition request to video acquisition control section 204 (step S2).

When a video data acquisition request that includes control instruction information is input from content management control section 203, video acquisition control section 204 starts corresponding content search and acquisition processing on storage section 210. Then video acquisition control section 204 outputs the acquired video data to decoding processing section 205. When video data is input from video acquisition control section 204, decoding processing section 205 starts decoding processing for the input video data (content playback processing) (step S3). Video data on which decoding processing has been performed is input to video output section 212, and output to a screen as video.

On detecting a deletion start point marking request (first time) from a remote control or suchlike external control device during content playback, external input reception section 201 outputs a marking request to marking time acquisition section 206. When a marking request is input from external input reception section 201, marking time acquisition section 206 outputs a time stamp acquisition request to video acquisition control section 204. When a time stamp acquisition request is input from marking time acquisition section 206, video acquisition control section 204 acquires a time stamp from video data acquired at the timing at which the time stamp acquisition request was input. Then video acquisition control section 204 outputs the acquired time stamp, as deletion start point information, to marking time acquisition section 206. Marking time acquisition section 206 temporarily holds the time stamp acquired from video acquisition control section 204 (step S4).

On detecting a second marking request from a remote control or suchlike external control device, external input reception section 201 outputs a marking request to marking time acquisition section 206. When a second marking request is input from external input reception section 201, marking time acquisition section 206 acquires a time stamp from video acquisition control section 204 as deletion end point information in the same way as the first time (step S4). Marking time acquisition section 206 temporarily holds the time stamp acquired from video acquisition control section 204 (step S5).

FIG. 6 shows an example of information (time stamps) held temporarily in step S4 and step S5 respectively. In FIG. 6, t3 and t4 indicate times corresponding to the duplicated video portion (scene B') shown in FIG. 5. That is to say, FIG. 6 shows an example in which a user marks the interval from t3 to t4 (scene B') shown in FIG. 5 as a deletion point. That is, as shown in FIG. 6, marking time acquisition section 206 holds an interval (scene B') from playback time t3 (12 minutes 30 seconds) to t4 (12 minutes 40 seconds) as a deletion point.

Marking time acquisition section 206 outputs time stamps (playback times t3 and t4) to content management control section 203. Content management control section 203 outputs an editing interval calculation request that includes playback times t3 and t4 to editing interval calculation section 207. Editing interval calculation section 207 performs processing that records playback times t3 (deletion start point) and t4 (deletion end point) as editing information (step S6). As shown in FIG. 7, editing information is recorded associated with an edited content name. The information shown in FIG. 7 (information comprising a content name, editing information, and a playback interruption position) is defined as server content information.

Figure 8:
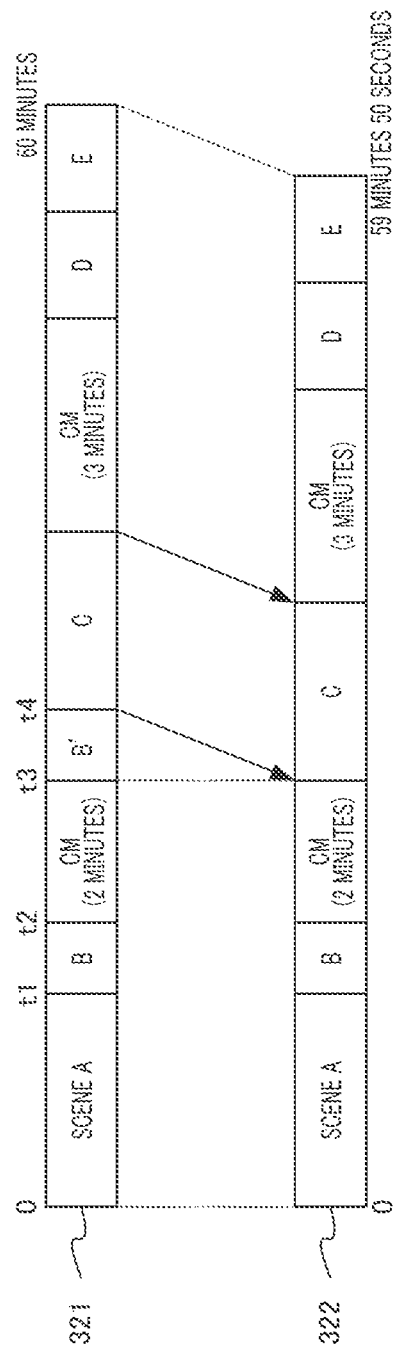
FIG. 8 is a drawing showing a program configuration before editing and a program configuration after editing according to an embodiment of the present invention.

FIG. 8 shows pre-editing content 321 and post-editing content 322. In FIG. 8, of the video duplicated portions (scene B and scene B') in pre-editing content 321, content management server 200 deletes scene B' (the interval from t3 to t4: 10 seconds). Therefore, in post-editing content 322 shown in FIG. 8, the overall content length has been reduced from 60 minutes to 59 minutes 50 seconds. This edited content 322 is stored in storage section 210.

The content editing method is not limited to editing by means of user button control. For example, the content editing method may also be a different method such as a case in which a duplicated portion of video is deleted by means of an automatic editing function of the system. It is possible for content management server 200 to manage editing information as described above even if content is edited by means of a different content editing method.

Content editing is not limited to video deletion, but also includes video addition. FIG. 9A shows an example in which scene F (the interval from t4 to t7: 2 minutes) is added between scene B' and scene C of pre-editing content 321 shown in FIG. 8. In post-editing content 341 shown in FIG. 9A, the overall content length has been increased from 60 minutes to 62 minutes. This post-editing content 341 is stored in storage section 210. Also, FIG. 9B shows server content information 342 generated after content editing. FIG. 9B shows that a new scene has been added to content with content name "Professional baseball news" in the interval from 16 minutes 30 seconds (addition start time t4) to 18 minutes 30 seconds (addition end time t7).

Next, the flowchart in FIG. 10A will be explained. The flowchart in FIG. 10A shows content playback processing, content skipping processing, and content playback interruption processing by content playback apparatus 100.

On detecting that a content playback request signal has been issued via a button provided on content playback apparatus 100, external input reception section 106 generates a playback request that includes control instruction information. External input reception section 106 inputs the playback request to content management control section 103 (step S7).

When a playback request that includes control instruction information is input, content management control section 103 outputs a video data acquisition request to video acquisition control section 107. When a video data acquisition request is input from content management control section 103, video acquisition control section 107 starts processing that acquires video data of the corresponding content from storage section 105 (step S8).

Video acquisition control section 107 inputs acquired video data to decoding processing section 108. Decoding processing section 108 performs decoding processing (playback processing) for the input video data. Decoded video data is input to video output section 109, and output to a screen (step S9).

By means of the processing in step S7 through step S9, it is possible for a user to view content.

If the user performs skipping processing for a CM or the like while viewing content, content playback apparatus 100 records skip information in storage section 105.

An actual example is given below. On detecting a skip start request via a button provided on content playback apparatus 100, external input reception section 106 generates a content skip start request. External input reception section 106 outputs the content skip start request to content management control section 103. When a content skip start request is input, content management control section 103 inputs a video skip request to video acquisition control section 107. When a video skip request is input, video acquisition control section 107 acquires a time stamp of the timing at which the video skip request was received from video data, and outputs the time stamp to content management control section 103. Then video acquisition control section 107 stops processing that outputs video data to decoding processing section 108, and switches to processing that discards video data. Content management control section 103 records the time stamp acquired from video acquisition control section 107 in storage section 105. For example, the time stamp is recorded in storage section 105 associated with a content name as skip information (skip start/skip end) as in terminal content information 301 shown in FIG. 2A. In the terminal content information shown in FIG. 2A, the skip start time is set to 10 minutes 30 seconds, and the skip end time is set to 12 minutes 30 seconds.

On detecting a playback interruption request via a button provided on content playback apparatus 100, external input reception section 106 generates a content playback interruption request. External input reception section 106 inputs the content playback interruption request to content management control section 103. When a content playback interruption request is input, content management control section 103 outputs a time stamp acquisition request to video acquisition control section 107. When a time stamp acquisition request is input, video acquisition control section 107 acquires a time stamp from video data acquired from storage section 105 at the timing at which the time stamp acquisition request was input. Video acquisition control section 107 outputs the time stamp to content management control section 103. Content management control section 103 records the acquired time stamp in storage section 105 as a playback interruption position (step S10). A playback interruption position is recorded in storage section 105 associated with a content name as in terminal content information 301 shown in FIG. 2A. In the terminal content information shown in FIG. 2A, a "Content name: Professional baseball news" playback interruption position is set to 12 minutes 35 seconds.

On detecting that there is a server (such as a content management server) in the area around content playback apparatus 100, communication control section 101 outputs a terminal content information acquisition request to content management control section 103. When a terminal content information acquisition request is input, content management control section 103 searches storage section 105 via content information acquisition section 104 to see whether or not the desired content is present (step S11). The above desired content is content for which playback has been interrupted, for example.

If the relevant content is present in the content search in step S11, content information acquisition section 104 outputs terminal content information to content management control section 103. Terminal content information includes, for example, a content name, skip start/skip end times, and a playback interruption position. When terminal content information is input from content information acquisition section 104, content management control section 103 determines that content for which playback has been interrupted is present in storage section 105. Then content management control section 103 outputs a content acquisition request that includes terminal content information to transmission/reception section 102. When a content acquisition request is input, transmission/reception section 102 outputs a content acquisition request that includes terminal content information to transmission/reception section 202 of content management server 200 (step S12).

In step S7 through step S12 shown in FIG. 10A above, content playback apparatus 100 processing is performed by means of the processing of each step.

Next, the flowchart in FIG. 10B will be explained. The flowchart in FIG. 10B shows post-editing content playback interruption position calculation processing by content management server 200.

In step S12 shown in FIG. 10A, a content acquisition request input from content playback apparatus 100 is input to content management control section 203 of content management server 200 via transmission/reception section 202.

When a content acquisition request is input, content management control section 203 outputs an acquisition request for the corresponding content to editing information acquisition section 208. If the corresponding content has undergone editing processing, editing information acquisition section 208 acquires editing information for that content (step S13).

The processing in step S13 will now be described in detail. Content management control section 203 outputs a content search request that includes terminal content information included in a content acquisition request input from content playback apparatus 100 to editing information acquisition section 208. Terminal content information indicates, for example, Content name: Professional baseball news, Skip start time: 10 minutes 30 seconds, Skip end time: 12 minutes 30 seconds, and Playback interruption position: 12 minutes 35 seconds. When a content search request is input, editing information acquisition section 208 searches storage section 210 to see whether or not content corresponding to "Content name" of the terminal content information is stored there. If corresponding content is found, editing information acquisition section 208 acquires editing information for the corresponding content, and outputs the acquired editing information to content management control section 203. Editing information for the corresponding content is, for example, the editing information included in server content information 311 shown in FIG. 3A.

Content management control section 203 inputs a playback interruption position calculation request that includes the acquired editing information and terminal content information acquired from content playback apparatus 100 to playback interruption position calculation section 209. The acquired terminal content information includes skip start/skip end times and a playback interruption position. Playback interruption position calculation section 209 performs post-editing content playback interruption position calculation processing based on the input editing information and terminal content information (step S14).

Actual procedures of post-editing content playback interruption position calculation processing performed by playback interruption position calculation section 209 in step S14 will now be described with reference to FIG. 11 through FIG. 13. In FIG. 11 through FIG. 13, the playback interruption position included in the terminal content information is t5, the skip start time is t2 (10 minutes 30 seconds), and the skip end time is t3 (12 minutes 30 seconds). Also, in FIG. 11 through FIG. 13, editing information indicates deletion start time t3 (12 minutes 30 seconds) and deletion end time t4 (12 minutes 40 seconds). That is to say, FIG. 11 through FIG. 13 show scene B' deletion processing.

<Procedure 1>

Playback interruption position calculation section 209 compares playback interruption position t5 with editing information (deletion start time t3, deletion end time t4).

<Procedure 2 (Case 1: FIG. 11)>

FIG. 11A shows a case in which, as a result of the comparison in procedure 1, playback interruption position t5 (5 minutes 20 seconds) precedes deletion start time t3 (that is, the editing interval). In this case, playback interruption position calculation section 209 records playback interruption position t5 in storage section 210 as a post-content-editing playback interruption position. That is to say, playback interruption position calculation section 209 takes pre-editing content playback interruption position t5 in content playback apparatus 100 as a playback restart position. Specifically, playback interruption position t5 is recorded associated with a content name as shown in FIG. 11B.

<Procedure 2 (Case 2: FIG. 12)>

FIG. 12A shows a case in which, as a result of the comparison in procedure 1, playback interruption position t5 (29 minutes 20 seconds) is after deletion end time t4 (the editing interval). In this case, playback interruption position calculation section 209 calculates a post-editing content playback interruption position by performing the processing described below.

For example, FIG. 12B shows a case in which editing information (an interval from t3: 12 minutes 30 seconds to t4: 12 minutes 40 seconds) is input. In this case, the time deleted by content editing (total editing time) is 10 seconds (=12 minutes 40 seconds−12 minutes 30 seconds). Using this total editing time and playback interruption position t5 (the pre-editing content playback interruption position), playback interruption position calculation section 209 calculates post-editing content playback interruption position t6 in accordance with equation 1.

In FIG. 12A, playback interruption position t6 is (playback interruption position t5: 29 minutes 20 seconds)−(total editing time 10 seconds)=29 minutes 10 seconds. That is to say, when playback interruption position t5 is after deletion end time t4 (the editing interval), playback interruption position calculation section 209 calculates a time that precedes playback interruption position t5 by a time equivalent to the editing interval as a post-content-editing playback interruption position. That is, playback interruption position calculation section 209 takes a time preceding playback interruption position t5 by a time equivalent to the editing interval (total editing time) as a playback restart position. Then playback interruption position calculation section 209 records playback interruption position t6 (29 minutes 10 seconds) in storage section 210 as shown in FIG. 12B. Specifically, as shown in FIG. 12B, playback interruption position t6 is recorded associated with a content name.

$$t6=(\text{Playback interruption position } t5)-(\text{Total editing time}) \quad \text{(Equation 1)}$$

<Procedure 2 (Case 3: FIG. 13)>

FIG. 13A shows a case in which, as a result of the comparison in procedure 1, playback interruption position t5 (12 minutes 35 seconds) is within an editing interval indicated in editing information. That is to say, FIG. 13A shows a case in which playback interruption position t5 is included between deletion start time t3 and deletion end time t4. In this case, playback interruption position calculation section 209 calculates a post-editing content playback interruption position by performing the processing described below.

Specifically, playback interruption position calculation section 209 acquires skip start time t2 (10 minutes 30 seconds) nearest content deletion start time t3 included in editing information from storage section 210. Then playback interruption position calculation section 209 calculates difference Δt between playback interruption position t5 (12 minutes 35 seconds) and deletion end time t4 (12 minutes 40 seconds) shown in terminal content information in accordance with equation 2.

$$\Delta t = t4 - t5 \quad \text{(Equation 2)}$$

Next, using skip start time t2 (10 minutes 30 seconds) nearest content deletion start time t3 and Δt calculated by means of equation 2 (here, 5 seconds), playback interruption position calculation section 209 calculates post-editing content playback interruption position t6 by means of equation 3. That is to say, when playback interruption position t5 is within an editing interval (t3 to t4), playback interruption position calculation section 209 calculates a post-content-editing playback interruption position (that is, playback restart position) as follows. Namely, playback interruption position calculation section 209 calculates a time that precedes a skip start time nearest playback interruption position t5 by a time equivalent to difference Δt between playback interruption position t5 and end time t4 of the editing interval as a post-content-editing playback interruption position.

In other words, procedure 2 (case 3) is a case in which, when deleting one of two identical content entities located on either side of a 2-minute CM period, playback interruption position t5 is within an editing interval corresponding to the deleted content entity.

Specifically, FIG. 13A shows a case in which, when deleting one (scene B') of two scenes, B and B', located on either side of a 2-minute CM period, playback interruption position t5 is within an editing interval (t3 to t4) corresponding to deleted scene B'. In this case, playback interruption position calculation section 209 takes a time resulting from subtracting difference Δt between the editing interval end time (t4) and playback interruption position (t5) from the end time (t2) of the other content entity, which is not deleted, (in FIG. 13A, scene B) as playback interruption position t6.

$$t6 = t2 - \Delta t \quad \text{(Equation 3)}$$

Playback interruption position calculation section 209 records playback interruption position t6 (here, 10 minutes 25 seconds) calculated by means of equation 3 in storage section 210. Specifically, playback interruption position t6 is recorded associated with a content name as shown in FIG. 13B.

If, as a result of calculating post-editing content playback interruption position t6, skip start/skip end times are present subsequent to playback interruption position t6, playback interruption position calculation section 209 performs the following processing. Namely, playback interruption position calculation section 209 records the skip start/skip end times in storage section 210 as control instruction information referenced when restarting playback by content playback apparatus 100. That is to say, control instruction information comprises, for example, an automatic skip start time and automatic skip end time.

Figures 14, 15:
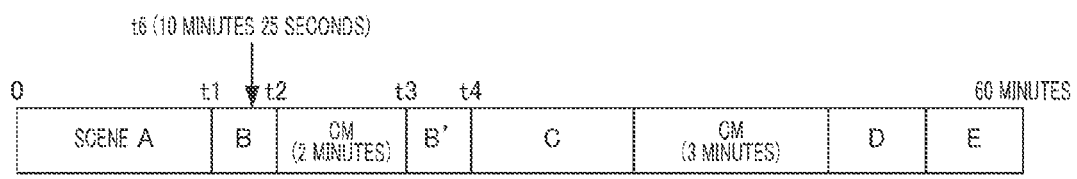
FIG. 14 is a drawing showing an example of a program configuration after playback interruption position calculation according to an embodiment of the present invention.
FIG. 15 is a drawing showing control instruction information relating to content skipping processing according to an embodiment of the present invention.

For example, FIG. 14 shows the result of playback interruption position calculation processing on the program configuration shown in FIG. 13A. FIG. 14 shows a case in which skip start time t2 (10 minutes 30 seconds) and skip end time t3 (12 minutes 30 seconds) are present subsequent to playback interruption position t6 (10 minutes 25 seconds).

Therefore, as shown in FIG. 15, playback interruption position calculation section 209 records t2 (10 minutes 30 seconds) in storage section 210 as an automatic skip start time, and records t3 (12 minutes 30 seconds) in storage section 210 as an automatic skip end time.

In the above description, actual post-editing content playback interruption position calculation processing procedures by playback interruption position calculation section 209 have been described. When the above processing ends, playback interruption position calculation section 209 notifies 203 that processing has ended.

In the descriptions of procedure 1 and procedure 2 here, a playback interruption position calculation method for a case in which video deletion is performed by means of content editing has been described. However, it is also possible for playback interruption position calculation section 209 to calculate a playback interruption position when a new scene has been added, as in the case of post-editing content 341 shown in FIG. 9. Procedures in this case are shown below.

<Procedure 1A>

Playback interruption position calculation section 209 compares playback interruption position t5 with editing information (addition start time t4, addition end time t7).

<Procedure 2 (Case 4: FIG. 16)>

FIG. 16A shows a case in which, as a result of the comparison in procedure 1A, playback interruption position t5 (29 minutes 20 seconds) is after addition end time t7 (that is, the editing interval). In this case, playback interruption position calculation section 209 calculates a post-editing content playback interruption position by performing the processing described below.

For example, FIG. 16B shows a case in which editing information (an interval from t4: 16 minutes 30 seconds to t7: 18 minutes 30 seconds) is input. In this case, the time added by content editing (total editing time) is 2 minutes (=18 minutes 30 seconds–16 minutes 30 seconds). Using this total editing time and playback interruption position t5 (the pre-editing content playback interruption position), playback interruption position calculation section 209 calculates post-editing content playback interruption position t6 in accordance with equation 4.

In FIG. 16A, playback interruption position t6 is (playback interruption position t5: 29 minutes 20 seconds)+(total editing time 2 minutes)=31 minutes 20 seconds. That is to say, when playback interruption position t5 is after addition end time t7 (the editing interval), playback interruption position calculation section 209 calculates a time that is later than playback interruption position t5 by a time equivalent to the editing interval as a post-content-editing playback interruption position. That is, playback interruption position calculation section 209 takes a time that is later than playback interruption position t5 by a time equivalent to the editing interval (total editing time) as a playback restart position. Then playback interruption position calculation section 209 records playback interruption position t6 (31 minutes 20 seconds) in storage section 210 as shown in FIG. 16B. Specifically, as shown in FIG. 16B, playback interruption position t6 is recorded associated with a content name.

$$t6 = (\text{Playback interruption position } t5) + (\text{Total editing time}) \quad \text{(Equation 4)}$$

<Procedure 2 (Case 5: FIG. 17)>

FIG. 17A shows a case in which, as a result of the comparison in procedure 1A, playback interruption position t5 precedes addition start time t4 (that is, the editing interval). In this case, playback interruption position calculation section 209 records playback interruption position t5 in storage section 210 as a post-content-editing playback interruption position. Playback interruption position t5, in short, indicates a content playback apparatus 100 pre-editing content playback interruption position, and indicates a post-content-editing playback interruption position (that is, playback restart position). Specifically, playback interruption position t5 is recorded associated with a content name as shown in FIG. 17B.

When notified by playback interruption position calculation section 209 that playback interruption position calculation processing has ended, content management control section 203 generates a content transfer request that includes playback information. Playback information includes a content name, playback interruption position, and control instruction information (automatic skip start/automatic skip end times). Then content management control section 203 outputs the content transfer request to data transfer section 211. When a content transfer request is input, data transfer section 211 acquires playback information (content name, playback interruption position, control instruction information) and a content entity of the corresponding content from storage section 210. Then data transfer section 211 outputs the playback information and content entity to transmission/reception section 202. When playback information and a content entity are input from data transfer section 211, transmission/reception section 202 outputs the playback information and content entity to transmission/reception section 102 of content playback apparatus 100 (step S15).

As described above, post-editing content playback interruption position calculation processing is performed by means of the processing in each of steps S13 through S15 shown in FIG. 10B.

Next, the flowchart in FIG. 10C will be explained. The flowchart in FIG. 10C shows playback restart processing from a playback interruption position by content playback apparatus 100.

When playback information and a content entity are input from content management server 200, transmission/reception section 102 inputs these data to content management control section 103. Using the input playback information, content management control section 103 searches storage section 105 for corresponding content. Then, if corresponding content is present, content management control section 103 performs playback information recording and content entity overwrite processing (content storage processing) on storage section 105 (step S16).

Figures 18A, 18B:
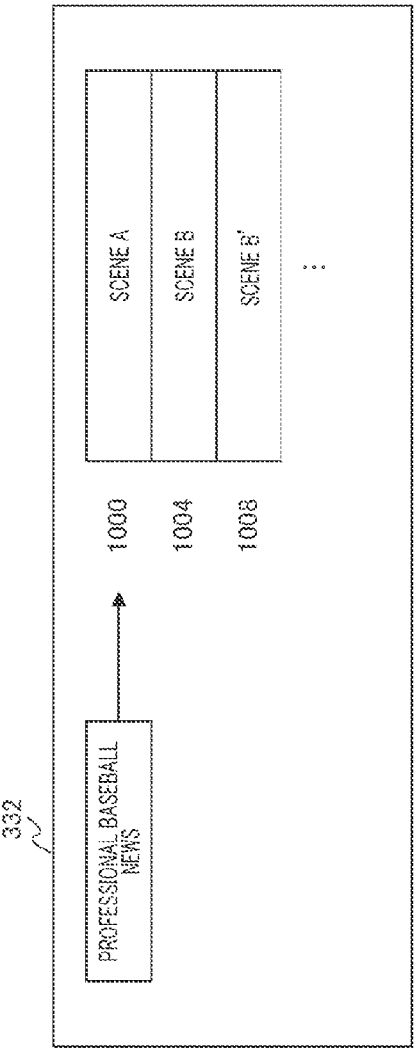
FIG. 18 is a drawing showing playback information, and information relating to a content name and content entity, according to an embodiment of the present invention.

Specifically, content management control section 103 performs recording of playback information 331 acquired from content management server 200 as shown in FIG. 18A. Content management control section 103 also performs overwrite processing in content name and content entity related information 332 as shown in FIG. 18B. Playback information 331 shown in FIG. 18A includes a content name, automatic skip start time, automatic skip end time, and playback interruption position.

External input reception section 106 detects a content playback request signal issued via a remote control or suchlike external control device, or a button provided on content playback apparatus 100. On detecting a content playback request signal, external input reception section 106 generates a playback request that includes content identification information, and outputs the playback request to content management control section 103 (step S17).

When a playback request that includes content identification information is input, content management control section 103 outputs a video data acquisition request to video acquisition control section 107. When a video data acquisition request is input, video acquisition control section 107 searches storage section 105 to see if playback information for the corresponding content is present. If playback information for the corresponding content is found, video acquisition control section 107 performs determination processing to determine whether or not there are automatic skip start time/automatic skip end time settings in the corresponding content (step S18).

Specifically, video acquisition control section 107 searches storage section 105 for corresponding content playback information based on the content name shown in playback information 331 in FIG. 18A. Then, if playback information is found as a result of the search, video acquisition control section 107 determines whether or not automatic skip start/automatic skip end times have been set in the playback information. If automatic skip start/automatic skip end times have been set in the playback information, video acquisition control section 107 performs processing that reads the set values. Furthermore, if a playback interruption position has been set in the corresponding content, video acquisition control section 107 performs processing that reads a numeric value of the playback interruption position (step S19).

Video acquisition control section 107 performs processing that reads from storage section 105 video data corresponding to a playback interruption position read from storage section 105 (step S20).

Video acquisition control section 107 compares an automatic skip start time of the playback information with a time stamp of video data acquired from storage section 105. If, as a result of the comparison, a time stamp is detected to have reached an automatic skip start time, video acquisition control section 107 deletes currently acquired video data, and acquires video data immediately after the automatic skip end time of the playback information. That is to say, video acquisition control section 107 performs skipping processing by deleting currently acquired video data and acquiring data immediately after an automatic skip end time of playback data (step S21).

Skipping processing will be described, for example, for a case in which post-editing content is program configuration 322 shown in FIG. 8, and content playback apparatus 100 pre-editing content playback interruption position t5 is the position shown in FIG. 13A. Also, playback information transmitted to content playback apparatus 100 is assumed to be playback information 331 shown in FIG. 18A.

Therefore, video acquisition control section 107 reads from storage section 105 video data corresponding to post-editing content playback interruption position t6 (10 minutes 25 seconds), as shown in FIG. 13B, and restarts content playback.

Furthermore, video acquisition control section 107 compares an automatic skip start time (for example, 10 minutes 30 seconds) of playback information 331 shown in FIG. 18A with a time stamp of video data acquired from storage section 105. Assume that, as a result of the comparison, video acquisition control section 107 detects that the time stamp has reached the automatic skip start time (10 minutes 30 seconds). In this case, video acquisition control section 107 deletes video data corresponding to the 10 minutes 30 seconds time stamp, and performs acquisition processing on storage section 105 to acquire video data immediately after the automatic skip end time (12 minutes 30 seconds) of playback information 331 shown in FIG. 18A.

By this means, a CM period once viewed by a user before content playback interruption (the 2-minute CM period in the program configuration shown in FIG. 13A) is skipped by content playback apparatus 100. That is to say, it is possible for a user to view video after the end of the CM period.

Thus, in this embodiment, content playback apparatus 100 transmits to content management server 200 terminal content information of pre-editing content copied from content management server 200. Terminal content information comprises, for example, a content name, playback interruption position, and skip start/skip end times. Skip start/skip end times represent an interval for which playback is not performed in response to a user skip operation or the like during playback viewing on content playback apparatus 100 (a non-playback period).

Using terminal content information, and editing information of edited content managed by content management server 200, content management server 200 then generates playback information used when restarting content playback on content playback apparatus 100. Then content management server 200 transmits the generated playback information to content playback apparatus 100. Edited content (post-editing content) editing information includes information on an added or deleted interval, for example. Playback information includes, for example, a playback interruption position re-calculated by content management server 200 after editing, and control instruction information referenced when playback is restarted by content playback apparatus 100.

Content playback apparatus 100 then uses the playback information to restart content playback from a suitable playback interruption position.

By this means, content management server 200 can calculate a content playback apparatus 100 playback interruption position appropriately according to editing processing even when performing editing processing on relevant content copied to content playback apparatus 100. As explained above, pre-editing content managed by content playback apparatus 100 and post-editing content managed by content management server 200 are assumed to differ in terms of content contents and content length. That is to say, in content playback apparatus 100, a difference in content contents and content length arises between pre-editing content being managed at the time of a content playback interruption and post-editing content re-copied at the time of a content playback restart. In this case also, it is possible for content playback apparatus 100 to restart content playback from a suitable playback interruption position.

That is to say, for content for which playback has been interrupted by content playback apparatus 100, playback may be restarted by content playback apparatus 100 after the content has been changed (edited) to a form desired by a user. At this time, according to this embodiment, even when a user re-views content for which viewing has been interrupted, it is possible for a user utilizing content playback apparatus 100 to restart content playback without being aware of content contents and content length.

In this embodiment, an example has been described in which post-editing content is played back by content playback apparatus 100 using a playback interruption position calculated by content management server 200 (post-editing content playback interruption position). However, this embodiment is not limited to this, and it is also possible, for example, for content management server 200 to play back post-editing content from a playback interruption position.

In this embodiment, it is also possible for content editing based video deletion/video addition processing and playback interruption position calculation processing to be executed by a mobile terminal (content playback apparatus).

In this embodiment, post-editing content playback interruption position calculation processing has been described for respective cases of video deletion or video addition by means of content editing. However, this embodiment is not limited to this, and it is also possible to calculate a post-editing content playback interruption position in a case in which video deletion and video addition occur simultaneously in content editing.

In this embodiment, it is possible, for example, to install a content playback apparatus in a mobile phone, mobile terminal, or the like, and to install a content management server in a hard disk recorder, digital TV, STB, or the like. That is to say, in a case in which content editing is performed within a recorder (content management server), also, a user utilizing a mobile phone (content playback apparatus) can restart content playback without being aware of content contents and content length.

As described above, a content management server according to this embodiment, in a system having a content playback apparatus that, when playback of interrupted content is restarted, acquires the content from a content management server, and the content management server that stores the content and performs editing of the content by deleting a portion within the content or adding to a portion within the content, is provided with a reception section that receives a first playback interruption position that is a position at which playback of the content was interrupted by the content playback apparatus, a calculation section that calculates a second playback interruption position corresponding to a position at which playback of the content was interrupted by the content playback apparatus in content after the editing, based on an editing interval deleted by the editing within the content and the first playback interruption position, and a transmission section that transmits the second playback interruption position to the content playback apparatus. By this means, in this embodiment, a user utilizing a content playback apparatus can restart content playback without being aware of content contents and content length even when content editing is performed by a content management server.

The sections described in this embodiment are configured by means of LSI (Large Scale Integration) typically comprising integrated circuitry. These sections may be implemented individually as single chips, or a single chip may incorporate some or all of them. Here, the term LSI has been used, but the terms IC, system LSI, super LSI, and ultra LSI may also be used according to differences in the degree of integration. The method of implementing integrated circuitry is not limited to LSI, and implementation by means of dedicated circuitry or a general-purpose processor may also be used. In this embodiment, the sections may also be configured using an FPGA (Field Programmable Gate Array) for which programming is possible after LSI fabrication, or a reconfigurable processor allowing reconfiguration of circuit cell connections and settings within an LSI. Furthermore, in this embodiment, integration of the sections may also be performed by means of an integrated circuit implementation technology whereby LSI is replaced by a different technology as an advance in, or derivation from, semiconductor technology. For example, in this embodiment, integration may also be performed by applying biotechnology.

The disclosure of Japanese Patent Application No.2010-131181, filed on Jun. 8, 2010, including the specification, drawings and abstract, is incorporated herein by reference in its entirety.

INDUSTRIAL APPLICABILITY

According to a content management server and content management method according to the present invention, when a user re-views content changed to a desired form, it is possible for the user to restart content playback from a playback interruption position without being aware of changes in content contents and content length due to editing. A content management server and content management method according to the present invention are suitable for use in a digital TV, recorder, mobile device, and so forth.

REFERENCE SIGNS LIST

100 Content playback apparatus
101 Communication control section
102 Transmission/reception section
103 Content management control section
104 Content information acquisition section
105 Storage section
106 External input reception section
107 Video acquisition control section
108 Decoding processing section
109 Video output section
200 Content management server
201 External input reception section
202 Transmission/reception section
203 Content management control section
204 Video acquisition control section
205 Decoding processing section
206 Marking time acquisition section
207 Editing interval calculation section
208 Editing information acquisition section
209 Playback interruption position calculation section
210 Storage section
211 Data transfer section
212 Video output section

The invention claimed is:
1. A content management server in a system having a content playback apparatus that, when playback of interrupted content is restarted, acquires the content from the content management server, and the content management server that stores the content and performs editing of the content by deleting a portion within the content or adding to a portion within the content, the content management server comprising:
 a reception section that receives a first playback interruption position that is a position at which playback of a first content before the editing was interrupted by the content playback apparatus, the first playback interruption position being a position from beginning of the first content;
 a calculation section that calculates a second playback interruption position corresponding to a position at which playback of a second content was interrupted by the content playback apparatus in the second content after the editing, based on an editing interval deleted by the editing and the first playback interruption position within the first content, the second playback interruption position being a position from beginning of the second content; and a transmission section that transmits the second playback interruption position to the content playback apparatus, wherein the calculation section, when the first playback interruption position precedes the editing interval, takes the first playback interruption position as the second playback interruption position.

2. The content management server according to claim 1, wherein the calculation section, when the first playback interruption position is after the editing interval, calculates a time that is earlier than the first playback interruption position by a time equivalent to the editing interval or a time that is later than the first playback interruption position by a time equivalent to the editing interval, as the second playback interruption position.

3. The content management server according to claim 1, wherein:
   the first content includes a first entity and two identical second entities located on either side of the first entity; and
   the calculation section, if, when deleting a second entity located after the first entity from among the second entities, the first playback interruption position is present within the editing interval corresponding to the second entity that is deleted, takes a time earlier than a start time of the first entity nearest the first playback interruption position by a time equivalent to a difference between an end time of the editing interval and the first playback interruption position as the second playback interruption position.

4. The content management server according to claim 1, wherein:
   the first content includes a first entity and two identical second entities located on either side of the first entity; and
   the calculation section, if, when deleting either of the second entities, the first playback interruption position is present within the editing interval corresponding to the second entity that is deleted, takes a time earlier than an end time of a second entity that is not deleted by a time equivalent to a difference between an end time of the editing interval and the first playback interruption position as the second playback interruption position.

5. A content management method in a system having a content playback apparatus that, when playback of interrupted content is restarted, acquires the content from a content management server, and the content management server that stores the content and performs editing of the content by deleting a portion within the content or adding to a portion within the content, the content management method comprising:
   reporting a first playback interruption position that is a position at which playback of a first content before the editing was interrupted by the content playback apparatus to the content management server from the content playback apparatus, the first playback interruption position being a position from beginning of the first content;
   calculating a second playback interruption position corresponding to a position at which playback of a second content was interrupted by the content playback apparatus in the second content after the editing, based on an editing interval deleted by the editing and the first playback interruption position within the first content, the second playback interruption position being a position from beginning of the second content; and
   reporting the second playback interruption position to the content playback apparatus from the content management server,
   wherein in calculating the second play back interruption position, when the first playback interruption position precedes the editing interval, takes the first playback interruption position as the second playback interruption position.

* * * * *